Figure 1:
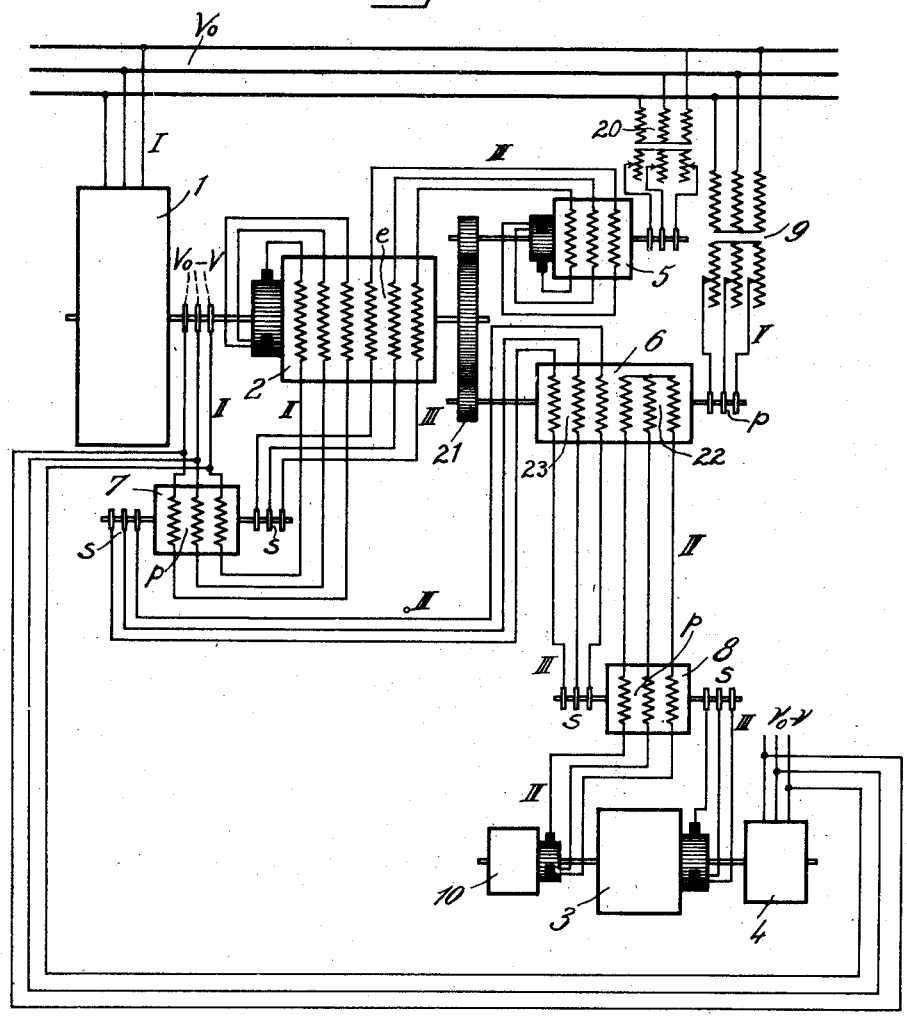

July 15, 1930.  J. OSSANNA ET AL  1,770,625
CASCADE REGULATING SET FOR ASYNCHRONOUS MACHINES
Filed April 10, 1928  4 Sheets-Sheet 1

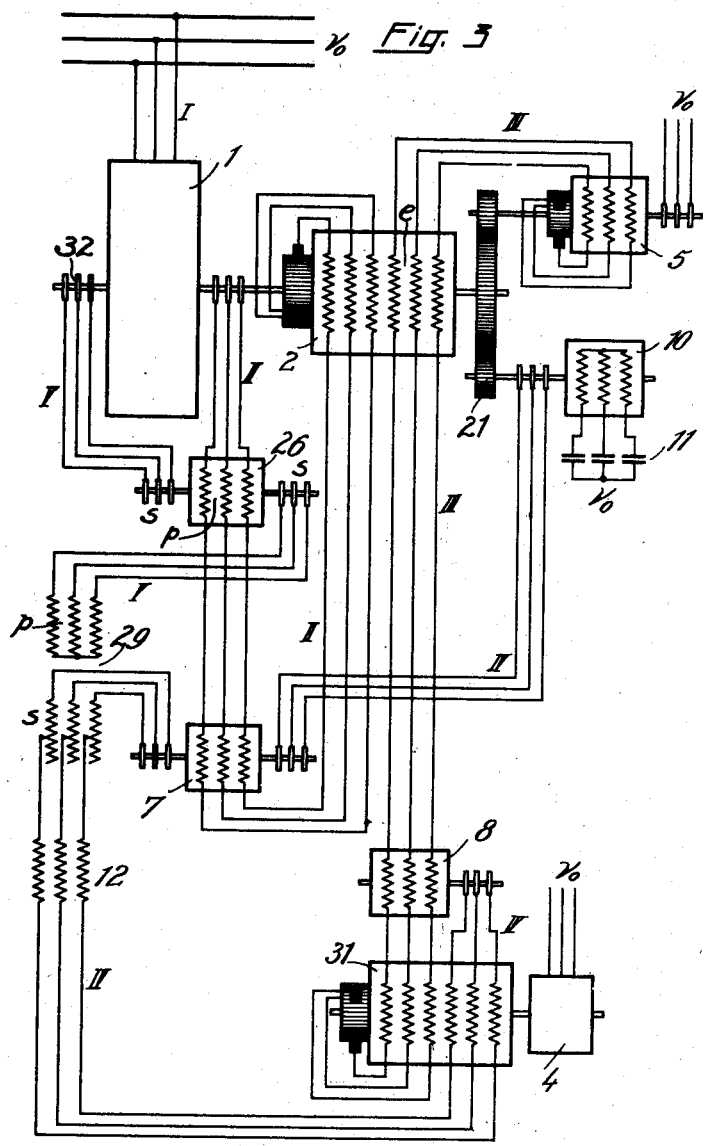

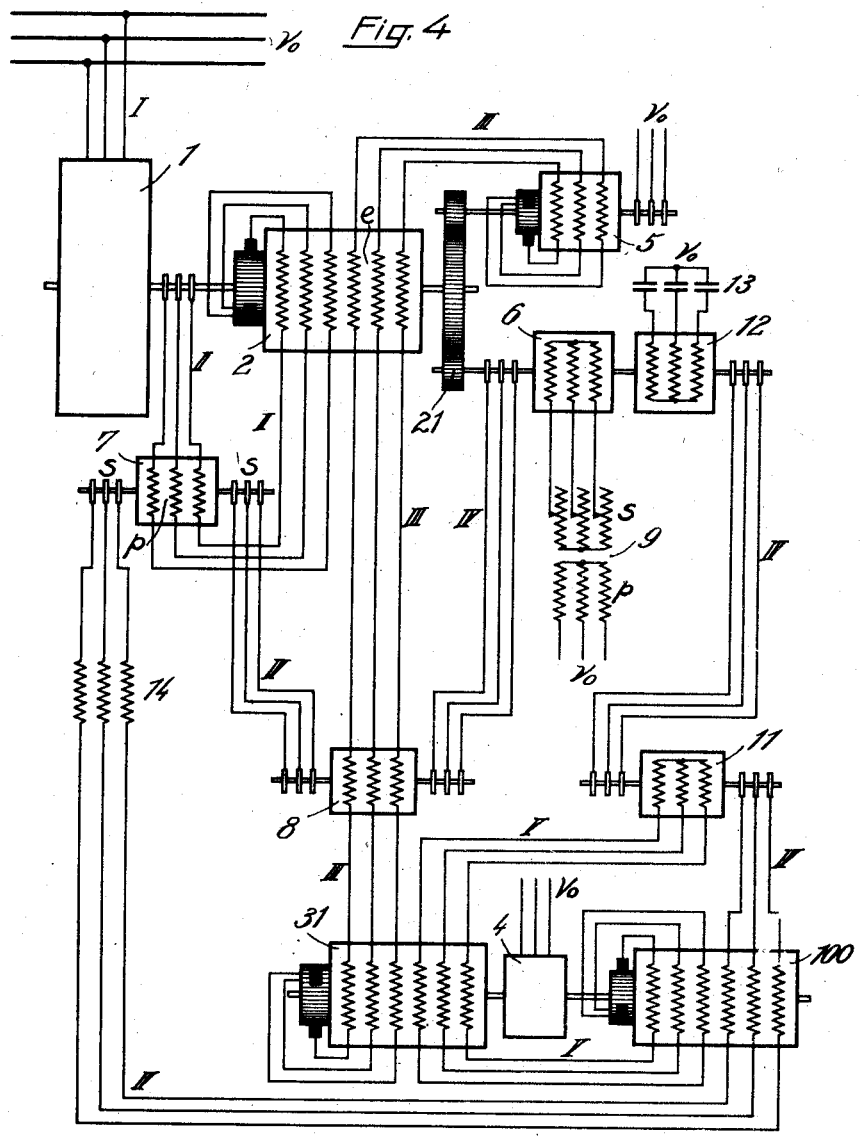

Patented July 15, 1930

1,770,625

UNITED STATES PATENT OFFICE

JOHANN OSSANNA AND HANS GRANER, OF MUNICH, AND FRITZ HOFMANN, OF MUNICH-TALKIRCHEN, GERMANY, ASSIGNORS TO SIEMENS-SCHUCKERTWERKE AKTIEN-GESELLSCHAFT, OF BERLIN-SIEMENSSTADT, GERMANY, A CORPORATION OF GERMANY

CASCADE-REGULATING SET FOR ASYNCHRONOUS MACHINES

Application filed April 10, 1928, Serial No. 268,940, and in Germany April 16, 1927.

Our invention relates to the control of the load current or of the power factor of induction machines, in particular asynchronous machines, in dependency of the speed of the machine in such manner that the load current or power factor which can be adjusted at will remains constant at varying speeds. In order to attain this result we connect in the secondary circuit of the asynchronous machine either directly or by way of further auxiliary commutator machines, a main commutator machine which is mechanically coupled with the main asynchronous machine, which main commutator machine is supplied with such exciter currents, that the main commutator machine introduces voltages into the secondary circuit of the asynchronous machine, one of which is proportional to the slip and neutralizes the secondary voltage of the asynchronous machine completely or partially, while the second voltage is independent of the slip and generates the load current in the secondary circuit of the asynchronous machine.

According to our invention additional exciter currents are supplied to the exciter winding of the main commutator machine, by which this commutator machine introduces in the secondary circuit of the asynchronous machine additional voltages, one of which is proportional to the square of the slip and neutralizes the influence of the speed variations of the main commutator machine, caused by its mechanical coupling with the asynchronous machine, upon the voltages introduced into the secondary circuit of the asynchronous machine by the main commutator machine. If desired additional exciter currents may be supplied to the exciter winding of the main commutator machine, which neutralize the influence of the secondary leakage reactance drop upon the value of the adjusted load current with the varying slip of the asynchronous machine.

In the drawings affixed hereto and forming part of our specification a number of embodiments of our invention are illustrated diagrammatically.

In these drawings

Figure 2:
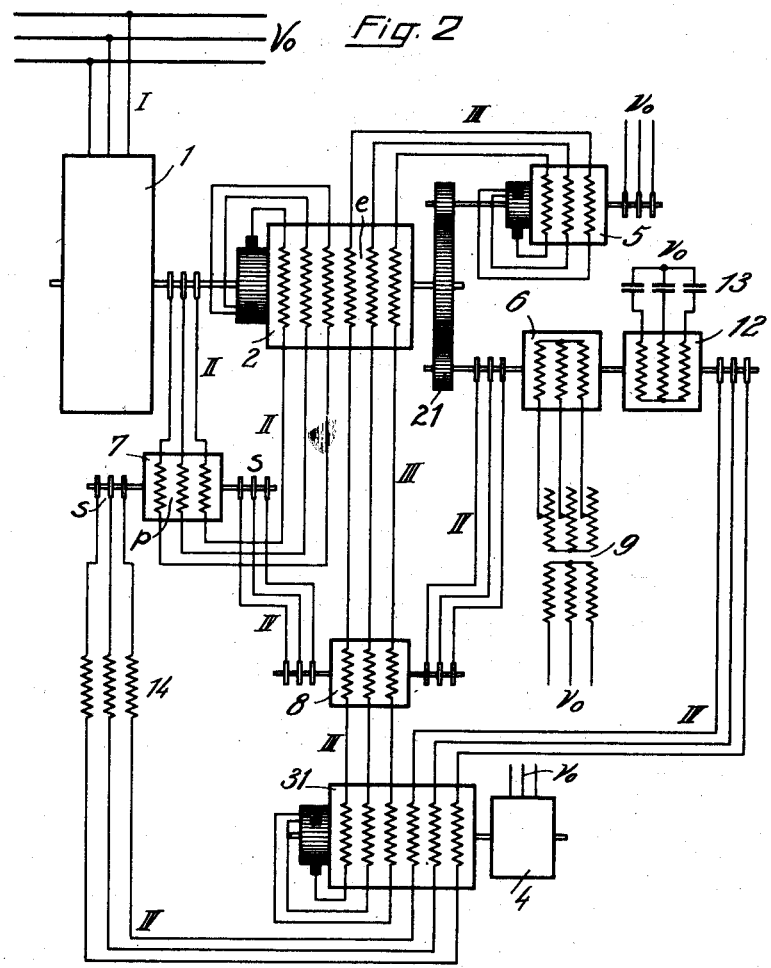

Fig. 1 represents the cascade arrangement of an asynchronous machine with a main commutator rear machine and a number of auxiliary machines for the excitation of the commutator machine in accordance with the invention, Fig. 2 represents a similar cascade arrangement in which for the excitation of the main commutator rear machine a specific auxiliary commutator machine is provided and in which the remaining auxiliary machines are correspondingly changed in their arrangements, Fig. 3 represents a modification of the arrangement shown in Fig. 2, in which in particular the main asynchronous machine is provided in its secondary circuit with an auxiliary winding which acts by way of auxiliary slip rings upon the exciter winding of an auxiliary commutator machine, and thus indirectly upon the excitation of the main commutator machine, and Fig. 4 also shows a cascade arrangement according to the invention in which for the excitation of the main commutator machine a second auxiliary commutator machine is provided.

Referring to Fig. 1 of the drawings, 1 is the asynchronous machine, the primary circuit I of which is connected to the three-phase network $V_0$. Into the secondary circuit II of the asynchronous machine is connected the commutator rear machine or main commutator machine 2 mechanically coupled with the main asynchronous machine 1. In the circuit III of the slip frequency carrying exciter winding in the stator of the commutator rear machine 2 are connected in series:

(1) A frequency converter 5, which is connected at its slip rings, by way of a variable static transformer 20, to the network $V_0$ and thus feed a voltage independent from the slip into the exciter circuit $e$ of the main commutator machine, which voltage produces by way of machine 2 in the secondary circuit II of the asynchronous machine 1 a load current independent of the slip;

(2) The secondary winding $s$ of a transformer 7, the primary winding of which is connected in the secondary circuit II of the asynchronous machine 1 (in this case, as in all other modifications to be described, transformer 7, as well as transformer 8, to be mentioned later, are phase shifting transformers or induction regulators, whose primary and secondary winding can be angularly shifted relatively to each other);

(3) The secondary winding 23 of an auxiliary asynchronous machine 6 mechanically coupled with the main machine 1 through a gearing 21 and the primary winding $p$ of which is excited from the network $V_0$ through a regulable transformer 9;

(4) The secondary winding $s$ of phase shifting transformer 8, the primary winding $p$ of which is fed from an auxiliary winding 22 in the secondary part of the asynchronous machine 6. In the exciter circuit III of the commutator rear machine there is also connected a self-excited phase shifter 3 (Leblanc type), which introduces into the exciter circuit $e$ of main commutator machine 2 a voltage compensating the inductive voltage drop of this circuit. This inductive voltage drop is mainly caused by the exciter winding $e$. Phase shifter 3 is for this purpose mechanically coupled with an auxiliary asynchronous motor 4, the primary of which is supplied with a voltage the frequency of which is equal to the slip frequency $V_0-V$ of the asynchronous machine 1, and may therefore be connected to the slip rings of the latter as shown.

The motor 4 thus runs with a speed proportional to the slip frequency. For the purpose of compensating the inductive voltage drop in the circuit IV, which comprises the auxiliary winding 22 in the secondary or stator part of the asynchronous machine 6 and the primary winding of the transformer 8, a second self-excited phase shifter 10 is provided, which is also mechanically coupled with the motor 4.

By the phase transformer 7, which, due to a large air gap, has a large magnetizing current and is therefore practically free from reaction, a voltage is introduced into the exciter circuit III of the commutator machine 2, which is proportional to the secondary current of the asynchronous machine 1 and proportional to the slip and which serves to neutralize the influence of the secondary leakage reactance drop in the asynchronous machine 1 upon the load current, to be maintained constant at varying slip. The auxiliary asynchronous machine 6 serves for neutralizing the secondary voltage of the asynchronous machine 1, which is proportional to its primary voltage and proportional to the slip. The primary winding of this machine 6 is fed by a regulable transformer 9, which is connected to the same supply system as the main asynchronous machine. The secondary winding 23 which is arranged in the stator of machine 6 is electrically connected into the exciter circuit III of the main commutator machine 2 which affects by way of this machine the secondary circuit of the main asynchronous machine 1 in the manner described.

This auxiliary asynchronous machine 6 further serves the purpose of introducing by way of its auxiliary secondary winding 22 and by means of the phase transformer 8, into the exciter circuit of the main commutator machine, and thus into the secondary circuit of the main asynchronous machine 1, a voltage which neutralizes the effect of the speed variations of the main commutator machine 2, coupled with the main asynchronous machine, upon the voltages introduced by the main commutator machine into the secondary circuit of the asynchronous machine. The variation of these voltages from the required value is proportionate to the square of the slip, the total voltage introduced by the main commutator machine into the secondary circuit of the asynchronous machine being essentially proportionate to the slip, and the deviation of the speed of commutator machine 2 from the required constant value being likewise proportionate to the slip. On the other hand, the voltage introduced by the phase transformer 8 into the exciter circuit III of the main commutator machine 2 is likewise proportionate to the square of the slip, since the voltage in the auxiliary secondary winding 22 of auxiliary machine 6 increases proportionate with the slip and since in the primary winding $p$ of phase transformer 8, owing to its connection with phase shifter 10, an exciter current is produced which is likewise proportionate to the slip. Since thus the field in the phase transformer 8 varies proportionate to the slip of main machine 1 in size as well as in speed of rotation, a voltage is induced in the secondary winding of transformer 8 which increases in proportion to the square of the slip. This voltage is dimensioned in value and adjusted in phase such that a voltage is introduced into the secondary circuit of main machine 1 by way of main commutator machine 2, which neutralizes the aforementioned effect of the speed variations of the main commutator machine 2.

Accordingly, into the exciter circuit III of the main commutator machine 2 the following voltages are introduced:

First of all the voltage of the frequency converter 5 which is independent of the slip and can be controlled by means of the adjustable voltage transformer 20; further the secondary voltage of phase shifter 7 which is on one hand proportionate to the secondary current of main machine 1, and on the other hand proportionate to the slip; further the voltage existing at the secondary winding 23 of the auxiliary asynchronous machine 6 which increases proportionate with the slip; lastly the voltage existing in the secondary winding of phase transformer 8 and which increases proportionate with the square of the slip.

Besides, the exciter circuit III includes also the phase compensator 3 which has the purpose of neutralizing the inductive voltage drop due to the current in circuit III, by means of introducing a counter voltage.

By the expedients thus described in the foregoing, it becomes possible to remove all interfering effects upon the desired control and to bring about a condition of the system in which the load current of the main asynchronous machine 1 remains constant at varying slip, whereby the amount of this load current can be adjusted at the transformers for any desired value to cause the asynchronous machine to either run as a motor or as a generator.

The wiring system of Fig. 1 has the disadvantage, that it necessitates comparatively large transformers (7, 8 and 9) and large auxiliary machines (3, 6 and 10), because these transformers and machines work upon the exciter circuit $e$ of the comparatively large main commutator machine 2. A very considerable reduction in size of the necessary transformers and auxiliary machines may be attained, if these transformers and machines are allowed to act on the exciter circuit of an auxiliary commutator machine driven at a constant or approximately constant speed this auxiliary machine feeding the exciter circuit $e$ of the main commutator machine 2. This case is illustrated in Fig. 2 of the drawings. In the circuit III of this modification instead of the phase compensator 3 of Fig. 1, is connected the much smaller high speed auxiliary commutator machine 31. In the exciter circuit IV of the auxiliary commutator machine 31 are effective: the nearly non-reactive phase transformers 7 and 8, and the secondary winding 23 of the practically non-reactive asynchronous auxiliary machine 6. The reactance drop of this circuit IV is compensated by a suitably driven second auxiliary asynchronous machine 12, whose secondary winding $s$ is loaded by condensers 13. This latter arrangement could be replaced by other suitable means such as a phase compensator 10 shown in Fig. 1, or a sufficiently large ohmic resistance.

The mode of operation of the arrangement in Fig. 2 is otherwise the same as that shown in Fig. 1. In particular the phase transformers 7 and 8, the auxiliary asynchronous machine 6 and the frequency converter 5 introduce by way of main commutator machine 2, respectively by way of the auxiliary commutator machine 31, into the secondary circuit of the main asynchonous machine 1 the same voltages as the corresponding auxiliary machines and transformers in Fig. 1.

The place of the practically non-reactive asynchronous machine 6 may also be taken by the corrected voltage of an auxiliary winding in the rotor of the main asynchronous machine 1. This case is shown in Fig. 3. In this figure it is assumed that the main asynchronous machine 1 is provided with an auxiliary winding in its secondary part (rotor) which for simplicity sake is not shown in Fig. 3, but which is denoted by the slip rings 32 as the point at which it can be connected to the outside. This auxiliary winding of machine 1 supplies by way of slip rings 32 the primary winding $p$ of the adjustable transformer 29, whose secondary winding $s$, (the same as the secondary winding of auxiliary asynchronous machine 6 of Fig. 2) is connected into the exciter circuit IV of the auxiliary commutator machine 31. The voltage which exists at the auxiliary slip rings 32 increases not exactly proportionate with the slip, because the auxiliary winding in the rotor of machine 1 is also induced by the magnetic stray flux due to the secondary load current in this machine. In order to compensate this difference a further phase transformer 26 is provided in Fig. 3, whose primary winding $p$ is connected into the secondary circuit II of the main asynchronous machine 1, and whose primary winding $s$ is connected into the primary circuit $p$ of transformer 29. In all other respects the arrangement shown in Fig. 3 is identical with that shown in Fig. 2.

A further substantial reduction in size of the transformers 7, 8 and 9 and the auxiliary asynchronous machines 6, 11 and 12 in Figs. 1 to 3 may be attained according to the arrangement in Fig. 4 by a further commutator machine 100, the task of which is to excite the commutator machine 31. In the exciter circuit IV of the commutator machine 100 are then effective four voltages proportional to the slip. The first three originating from practically non-reactive phase transformers 7, 8 and 111 are proportional to the secondary current of the main asynchronous machine, or to the exciter current of the main commutator machine 2, or to the exciter current of the auxiliary commutator machine 31, connected in the exciter circuit of the main commutator machine 2. The fourth voltage originates from a practically non-reactive auxiliary asynchronous machine 6, mechanically coupled with main machine 1, the primary voltage of which auxiliary machine may be regulated by a variable stationary transformer 9, which has its primary $p$ connected to the main line (denoted at the transformer by $V_o$).

The reactance drop in the exciter circuit IV is here compensated in the same manner as shown in Figs. 2 and 3.

In the system of connections illustrated in all the figures it is assumed, that the voltage of the frequency changer 5 is introduced into the exciter circuit of the main commutator machine. It is, however, possible to introduce this voltage also into other circuits, such as the circuit V of Fig. 4, or into the secondary circuit of the main machine. In the former case the frequency converter would permit of a substantial reduction in size, in the latter case it would require a substantial increase.

Various modifications and changes may be made without departing from the spirit and the scope of the invention, and we desire, therefore, that only such limitations shall be placed thereon as are imposed by the prior art.

We claim as our invention:—

1. In combination, an asynchronous machine, a commutator machine connected in the secondary circuit of said asynchronous machine and being mechanically coupled with said asynchronous machine, an exciter winding on said commutator machine, sources of current for feeding said exciter winding and for introducing a plurality of voltages through said commutator machine into the secondary circuit of the asynchronous machine, one of which is proportional to the slip for neutralizing the secondary voltage of the asynchronous machine, a second of which remains constant in its magnitude when the slip of the asynchronous machine varies, and a third of which is proportional to the square of the slip for neutralizing the influence of the speed fluctuations of said commutator machine upon the voltages introduced into the secondary circuit of the asynchronous machine by the commutator machine.

2. In combination, an asynchronous machine, a commutator machine connected in the secondary circuit of said asynchronous machine and being mechanically coupled with said asynchronous machine, an exciter winding on said commutator machine, sources of current for feeding said exciter winding and for introducing a plurality of voltages through said commutator machine into the secondary circuit of the asynchronous machine, one of which is proportional to the slip for neutralizing the secondary voltage of the asynchronous machine, a second of which remains constant in its magnitude when the slip of the asynchronous machine varies, a third of which is proportional to the square of the slip for neutralizing the influence of the speed fluctuations of said commutator machine upon the voltages introduced into the secondary circuit of the asynchronous machine by the commutator machine, and a fourth of which is proportional to the slip and to the secondary current of the asynchronous machine for neutralizing the secondary leakage reactance drop in the secondary circuit of the asynchronous machine.

3. In combination, a main alternating current supply line, an asynchronous machine having its primary circuit connected to said supply line, a commutator machine connected with the secondary circuit of said asynchronous machine and being mechanically coupled with said asynchronous machine, a slip frequency carrying exciter winding in the stator of said commutator machine, a frequency converter connected at one side to said exciter circuit and at the other side to said main supply line, a phase transformer carrying slip frequency currents in its primary winding and having its secondary winding connected to the exciter circuit of the commutator machine, and being adjusted, with respect to value and phase of the voltage supplied by it to said exciter winding, to neutralize the effect of the speed variations of the commutator machine upon the voltages introduced by the commutator machine into the secondary circuit of said asynchronous machine, sources of current connected to said transformer for generating in the primary winding of the transformer an exciter current proportional to the slip, and sources of current for feeding the exciter winding of the commutator machine and for introducing through the commutator machine into the secondary circuit of the asynchronous machine a voltage, which is proportional to the slip for opposing the secondary voltage of the asynchronous machine.

4. In combination a main alternating current supply line, an asynchronous machine having its primary circuit connected to said supply line, a commutator machine connected with the secondary circuit of said asynchronous machine and being mechanically coupled with said machine, a slip frequency carrying exciter winding in the stator of said commutator machine, a frequency converter connected at one side into the exciter of said commutator machine and at the other side to said main supply line, a phase transformer carrying slip frequency currents in its primary winding and having its secondary winding connected with the exciter circuit of said commutator machine, and being adjusted, with respect to value and phase of the voltage supplied by it to said exciter winding, to neutralize the effect of the speed variations of the commutator machine upon the voltage introduced by the commutator machine into the secondary circuit of said asynchronous machine, a second phase transformer, having its primary winding connected with the secondary winding of said asynchronous machine, means for introducing the voltage supplied by the secondary winding of said second transformer into the exciter circuit of said commutator machine, and sources of current for feeding the exciter winding of said commutator machine for introducing by way of said commutator machine into the secondary circuit of the asynchronous machine voltages which are proportionate to the slip and which neutralize the secondary voltage of the asynchronous machine.

5. In combination a main alternating current supply line, an asynchronous machine having its primary circuit connected to said supply line, a commutator machine connected with the secondary circuit of said asynchronous machine and being mechanically coupled with said machine, a slip frequency carrying exciter winding in the stator of said commutator machine, a frequency converter connected at one side into the exciter circuit of said commutator machine and at the other side to said main supply line, a substantially non-reactive phase transformer carrying slip frequency currents in its primary winding and having its secondary winding connected with the exciter circuit of said commutator machine, and being adjusted, with respect to value and phase of the voltage supplied by it to said exciter winding, to neutralize the effect of the speed variations of the commutator machine upon the voltage introduced by the commutator machine into the secondary circuit of said asynchronous machine, a substantially non-reactive second phase transformer, having its primary winding connected with the secondary winding of said asynchronous machine, means for introducing the voltages supplied by the secondary winding of said second transformer into the exciter circuit of said commutator machine, and sources of current for feeding the exciter winding of said commutator machine for introducing by way of said commutator machine into the secondary circuit of the asynchronous machine voltages which are proportionate to the slip and which neutralize the secondary voltage of the asynchronous machine.

6. In combination a main alternating current supply line, an asynchronous machine having its primary circuit connected to said supply line, a commutator machine connected with the secondary circuit of said asynchronous machine and being mechanically coupled with said machine, a slip frequency carrying exciter winding in the stator of said commutator machine, a frequency converter connected at one side into the exciter circuit of said commutator machine and at the other side to said main supply line, a substantially non-reactive phase transformer carrying slip frequency currents in its primary winding and having its secondary winding connected with the exciter circuit of said commutator machine, and being adjusted, with respect to value and phase of the voltage supplied by it to said exciter winding, to neutralize the effect of the speed variations of the commutator machine upon the voltage introduced by the commutator machine into the secondary circuit of said asynchronous machine, a substantially non-reactive second phase transformer, having its primary winding connected with the secondary winding of said asynchronous machine, means for introducing the voltages supplied by the secondary winding of said second transformer into the exciter circuit of said commutator machine, an auxiliary winding in the secondary portion of said asynchronous machine, means for applying the voltage developed in said winding to the exciter circuit of said commutator machine, and means for adjusting the value and phase of said voltage to produce through said commutator machine in the secondary circuit of said asynchronous machine, a voltage which neutralizes the secondary voltage of the asynchronous machine.

7. In combination a main alternating current supply line, an asynchronous machine having its primary circuit connected to said supply line, a main commutator machine connected with the secondary circuit of said asynchronous machine and being mechanically coupled with said machine, a slip frequency carrying exciter winding in the stator of said main commutator machine, an auxiliary commutator machine connected in circuit with the exciter winding of said main machine, an exciter winding in the stator of said auxiliary machine, sources of current for feeding said auxiliary winding and for introducing by way of said auxiliary and said main commutator machine into the secondary circuit of the asynchronous machine a plurality of voltages, one of which is proportional to the slip and to the secondary current of the asynchronous machine for neutralizing the secondary leakage reactance drop in said secondary machine circuit, a second one of which voltages is proportional to the slip for neutralizing the secondary voltage of the asynchronous machine, a frequency converter having one side connected with the exciter circuit of said main commutator machine and its other side connected with said main supply line, a phase transformer having means for supplying its primary winding with currents proportional to the slip, and having its secondary winding connected with the exciter circuit of said main commutator machine, and being adjusted, with respect to value and phase of the voltage supplied by it to said exciter winding, to neutralize the effect of the speed variations of the main commutator machine upon the voltage introduced by said commutator machine into the secondary circuit of said asynchronous machine.

In testimony whereof we affix our signatures.

JOHANN OSSANNA.
HANS GRANER.
FRITZ HOFMANN.